(12) United States Patent
Zhou et al.

(10) Patent No.: US 12,372,182 B2
(45) Date of Patent: Jul. 29, 2025

(54) CONNECTION STRUCTURE, BATTERY, AND POWER CONSUMPTION DEVICE

(71) Applicant: CONTEMPORARY AMPEREX TECHNOLOGY (HONG KONG) LIMITED, Hong Kong (CN)

(72) Inventors: Cong Zhou, Ningde (CN); Xiaoteng Huang, Ningde (CN); Jiarong Hong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 74 days.

(21) Appl. No.: 18/455,142

(22) Filed: Aug. 24, 2023

(65) Prior Publication Data

US 2023/0400133 A1 Dec. 14, 2023

Related U.S. Application Data

(63) Continuation of application No. PCT/CN2022/075067, filed on Jan. 29, 2022.

(51) Int. Cl.
  *F16L 37/12* (2006.01)
  *F16L 37/084* (2006.01)
  *H01M 10/613* (2014.01)

(52) U.S. Cl.
  CPC .......... *F16L 37/12* (2013.01); *F16L 37/0841* (2013.01); *H01M 10/613* (2015.04); *F16L 2201/10* (2013.01)

(58) Field of Classification Search
  CPC ... F16L 37/144; F16L 37/088; F16L 37/1225; F16L 2201/10; F16L 37/12; F16L 37/084; F16L 37/113
  See application file for complete search history.

(56) References Cited

U.S. PATENT DOCUMENTS

2006/0103134 A1\* 5/2006 Kerin .................... F16L 37/144
                                                                 285/305
2019/0003626 A1  1/2019 Stieler
(Continued)

FOREIGN PATENT DOCUMENTS

CN   104295836 A   1/2015
CN   213065029 U   4/2021
(Continued)

OTHER PUBLICATIONS

The World Intellectual Property Organization (WIPO) International Search Report for PCT/CN2022/075067 Jul. 6, 2022 6 pages (with translation).

(Continued)

*Primary Examiner* — Zachary T Dragicevich
*Assistant Examiner* — James A Linford
(74) *Attorney, Agent, or Firm* — ANOVA LAW GROUP, PLLC

(57) ABSTRACT

A connection structure includes a male connector, a female connector including a first clamping portion and a through hole for inserting the male connector, a marking member including a second clamping portion configured to be clamped with the first clamping portion, and a locking member installed on the female connector. The locking member is configured to move from a first position to a second position when an insertion depth of the male connector reaches a preset value, so as to lock the male connector and drive the second clamping portion to separate from the first clamping portion.

17 Claims, 7 Drawing Sheets

(56) References Cited

U.S. PATENT DOCUMENTS

2021/0285581 A1\* 9/2021 Rydin ................. F16L 37/0885
2024/0271732 A1\* 8/2024 Xu ........................ F16L 37/144

FOREIGN PATENT DOCUMENTS

| EP | 3786506 A1 | 3/2021 | |
|---|---|---|---|
| JP | H04506555 A | 11/1992 | |
| JP | 2007292281 A | 11/2007 | |
| JP | 2010078077 A | 4/2010 | |
| JP | 2020183813 A | 11/2020 | |
| WO | WO-2006099933 A1 \* | 9/2006 | ............ F16L 37/088 |
| WO | 2010035755 A1 | 4/2010 | |

OTHER PUBLICATIONS

The European Patent Office (EPO) Extended Search Report for EP Application No. 22922898.6, Mar. 15, 2024 6 Pages.
The Japan Patent Office (JPO) Notice of Reasons for Refusal for Application No. 2023-549914 Sep. 17, 2024 16 Pages (including translation).
The World Intellectual Property Organization (WIPO) Written Opinion for PCT/CN2022/075067 Jul. 6, 2022 7 Pages (including translation).

\* cited by examiner

CONNECTION STRUCTURE, BATTERY, AND POWER CONSUMPTION DEVICE

CROSS-REFERENCE TO RELATED APPLICATION

This application is a continuation of International Application No. PCT/CN2022/075067, filed on Jan. 29, 2022, the entire content of which is incorporated herein by reference.

TECHNICAL FIELD

The present disclosure relates to the technical field of battery technology, and specifically, to a connection structure, a battery, and a power consumption device.

BACKGROUND ART

In the related art, when assembling male and female connectors, users usually rely on experience or naked eye observation to confirm whether the male and female connectors are assembled in place, and the error rate of this judgment method is extremely high, resulting in frequent cases of male and female connectors not being assembled in place.

SUMMARY

The object of the embodiments of the present disclosure is to provide a connection structure, a battery, and a power consumption device, for increasing accuracy of assembly of connectors and avoiding occurrence of male and female connectors of the connection structure not being assembled in place.

In a first aspect, the embodiments of the present disclosure provide a quick connector, including: a male connector; a female connector, including a first clamping portion and a through hole for inserting the male connector; a marking member, including a second clamping portion, which is configured to be clamped with the first clamping portion; and a locking member, installed on the female connector, wherein the locking member is configured to move from a first position to a second position when an insertion depth of the male connector reaches a preset value, so as to lock the male connector and drive the second clamping portion to separate from the first clamping portion.

In the technical solution of the embodiments of the present disclosure, before the male connector is inserted into the through hole of the female connector, both the marking member and the locking member are preinstalled on the female connector. Specifically, the marking member surrounds the local peripheral side of the female connector, the second clamping portion of the marking member is clamped with the first clamping portion on the peripheral side of the female connector, the locking member and the marking member are located on the same side of the female connector, and the locking member also surrounds the local peripheral side of the female connector. The locking member passes through the marking member and is movably clamped with the female connector. and at this time, the position of the locking member is the first position. When the male connector is assembled with the female connector, that is, the male connector is inserted into the through hole of the female connector, after the insertion depth of the male connector reaches a preset value, the locking member moves from the first position in a direction close to the female connector, wherein when it is not movable, the locking member is locked with the female connector, and the male connector is also locked in the through hole of the female connector. When the locking member moves from the first position in a direction close to the female connector, the position on the locking member abutted against the marking member constantly changes, and an outer diameter of the locking member where the locking member is abutted against the locking member continuously increases, so that an outer wall of the locking member compresses an inner wall of the marking member, and applies a force in a direction away from the female connector to the inner wall of the marking member, ultimately separating the marking member from the female connector. In the technical solution of the embodiments of the present disclosure, by providing the marking member and the locking member, when the male and female connectors are assembled in place, the marking member will automatically separate from the female connector, and the locking member can no longer move relative to the female connector. By observing these two objective phenomena, the user can confirm that the male and female connectors have been assembled in place, thereby avoiding the occurrence of the male and female connectors being not assembled in place, and improving accuracy of assembly.

In some embodiments, the first clamping portion is configured as a first clamping groove on a peripheral side of the female connector, and the second clamping portion is configured as a first clamping hook on the marking member. The inner wall surface of the first clamping groove on the peripheral side of the female connector is matched with the outer wall of the first clamping hook of the marking member. The marking member and the female connector are connected by means of clamping of the first clamping hook in the first clamping hook, which is not only simple in structure, but also more convenient for the locking member to compress the marking member to separate the marking member from the female connector. On the premise of ensuring that the female connector and the male connector are assembled in place, the assembly efficiency of the female connector and male connector can be improved.

In some embodiments, two first clamping grooves are formed, and the two first clamping grooves are formed at intervals on the peripheral side of the female connector; and two first clamping hooks are provided, and the two first clamping hooks are configured to be clamped with the two first clamping grooves, respectively. By providing two sets of first clamping grooves and first clamping hooks that are mutually cooperated and clamped, wherein the two sets of first clamping grooves and first clamping hooks are respectively located at two symmetrical ends of the peripheral side of the female connector, the stability of the connection between the marking member and the female connector is ensured.

In some embodiments, the locking member is formed with a second clamping groove, the marking member is provided with a second clamping hook, and the second clamping hook is configured to be clamped with the second clamping groove, wherein when the locking member moves from the first position to the second position, the locking member is configured to drive the second clamping hook to separate from the second clamping groove. Since the marking member itself is clamped in the first clamping hook of the female connector through the first clamping hook, the position of the marking member relative to the female connector is fixed. After the second clamping hook is provided on the marking member and the second clamping groove is formed on the locking member, when the locking member is in the first position, the second clamping hook is exactly clamped in the second clamping groove of the locking member, so that the locking member is connected to the marking member. On the one hand, positioning of the locking member is achieved, that is, when the second clamping hook of the marking member is exactly clamped in the second clamping groove of the locking member, the locking member is exactly in the first position, and in this way, it can be ensured that the male connector can be smoothly inserted into the through hole of the female connector; on the other hand, when the locking member moves from the first position to the second position, the locking member compresses the locking member, so that the marking member is separated from the locking member while is also separated from the female connector, providing an objective reference condition for the user to confirm whether the female connector and male connector are assembled in place.

In some embodiments, two second clamping grooves are formed, and the two second clamping grooves are correspondingly formed on two sides of the locking member; and two second clamping hooks are provided, and the two second clamping hooks are configured to be clamped with the two second clamping grooves, respectively. By providing two sets of second clamping grooves and second clamping hooks that are mutually cooperated and clamped, wherein the two sets of second clamping grooves and second clamping hooks are respectively located at two symmetrical ends of the marking member or the locking member, the stability of the connection between the marking member and the locking member is ensured.

In some embodiments, a peripheral surface of the male connector is formed with an annular groove, and the locking member includes a clamping platform and two connecting arms below the clamping platform, wherein the two connecting arms are provided at intervals below the clamping platform, the two second clamping grooves are formed between the two connecting arms and the clamping platform, and the clamping platform is configured to be inserted into the annular groove when the locking member is in the second position. When the male connector is inserted into the through hole of the female connector, and when the annular groove and the clamping platform of the locking member are in the same plane, the insertion depth of the male connector reaches the preset value, so that the locking member can be moved from the first position to the second position to make the inner diameter of the clamping platform of the locking member abut against the outer diameter of the annular groove of the male connector. As the inner diameter of the clamping platform is not greater than the outer diameter of the annular groove of the male connector, when the clamping platform is inserted into the annular groove, the male connector will not continue to move downwards along the through hole of the female connector. At this time, the locking member is locked with the male connector, while the locking member has also been locked with the female connector, so that the male connector is locked with the female connector, thus completing the assembly of the male connector and the female connector.

In some embodiments, a peripheral side of the female connector is formed with a third clamping groove, the locking member is further provided with a third clamping hook, and the third clamping hook is configured to be inserted into the third clamping groove when the locking member is in the first position. By providing a third clamping groove on the peripheral side of the female connector, and correspondingly providing a third clamping hook on the locking member, when the third clamping hook of the locking member is clamped with the third clamping groove of the female connector, the locking member is exactly in the first position, so that positioning of the locking member is achieved, enabling the locking member to quickly be in the first position during installation. In addition, this can also prevent the locking member from accidentally falling off the female connector. Meanwhile, when the locking member is in the first position, as the clamping platform of the locking member is located between the inner diameter and the outer diameter of the through hole of the female connector, it can be ensured that the male connector can be smoothly inserted into the through hole of the female connector.

In some embodiments, two third clamping grooves are formed, and the two third clamping grooves are formed at intervals on the peripheral side of the female connector; and two third clamping hooks are provided, and the two third clamping hooks are provided at respective ends of the two connecting arms away from the clamping platform. By providing two sets of third clamping grooves and third clamping hooks that are mutually cooperated and clamped, wherein the two sets of third clamping grooves and third clamping hooks are respectively located at two symmetrical ends of the female connector or the locking member, the stability of the connection between the female connector and the locking member is ensured.

In some embodiments, one side of each of the connecting arms away from the through hole is formed with a groove, which is configured to be abutted against the female connector when the male connector is inserted into the through hole. By providing the groove, during the assembly of the male connector and the female connector, the groove is abutted against the local peripheral side of female connector, thereby increasing the contact area between the locking member and the female connector, and ensuring the stability of the connection between the locking member and the female connector.

In some embodiments, one side of the locking member facing the through hole is formed with a limit groove, and an edge of the through hole is provided with a limit block corresponding to the limit groove, wherein the limit block is configured to be inserted into the limit groove when the locking member is in the second position. By providing a limit block outside the edge of the through hole of the female connector, and providing a limit groove correspondingly on the locking member, when the locking member moves to the second position, that is, when the female connector and the male connector are assembled in place, the limit block is exactly inserted into the limit groove, thereby preventing the locking member from moving, so that the structure is simple and the operation is convenient.

In some embodiments, the marking member is provided with a pulling portion, which is configured for a user to remove the marking member from the locking member. By providing the pulling portion, when the assembly of the male connector and the female connector is completed, it is convenient for the user to remove the marking member from the locking member through the pulling portion, and a force application point is provided for the user to remove the marking member, facilitating the user operation.

In some embodiments, the marking member is formed with an installation gap, which is configured to accommodate a part of the locking member. By providing the installation gap, the locking member can pass through the marking member from the installation gap, and then surround the local peripheral side of the female connector and is connected to the female connector.

In some embodiments, one side of the marking member facing the locking member is provided with a positioning column, and one side of the locking member facing the marking member is formed with a positioning hole, wherein the positioning column is configured to be inserted into the positioning hole to connect the locking member and the marking member.

In a second aspect, the embodiments of the present disclosure provide a battery, including the connection structure according to the above embodiments, wherein the connection structure is configured to connect cooling pipelines of a cooling system of the battery.

In a third aspect, the embodiments of the present disclosure provide a power consumption device, including the battery according to above embodiments, wherein the battery is configured to provide electrical energy.

The above description is only an overview of the technical solution of the present disclosure. In order to have a clearer understanding of the technical means of the present disclosure, it can be implemented in accordance with the content of the description. In order to make the above and other purposes, features, and advantages of the present disclosure more obvious and understandable, the specific implementation modes of the present disclosure are listed below.

BRIEF DESCRIPTION OF DRAWINGS

In order to more clearly illustrate technical solutions of the embodiments of the present disclosure, the following will briefly describe drawings to be used in the embodiments of the present disclosure, and it is obvious that the drawings described below are only some embodiments of the present disclosure, and for a person of ordinary skill in the art, other drawings can be obtained according to the described drawings without any creative work.

DETAILED DESCRIPTION OF EMBODIMENTS

Figure 1:
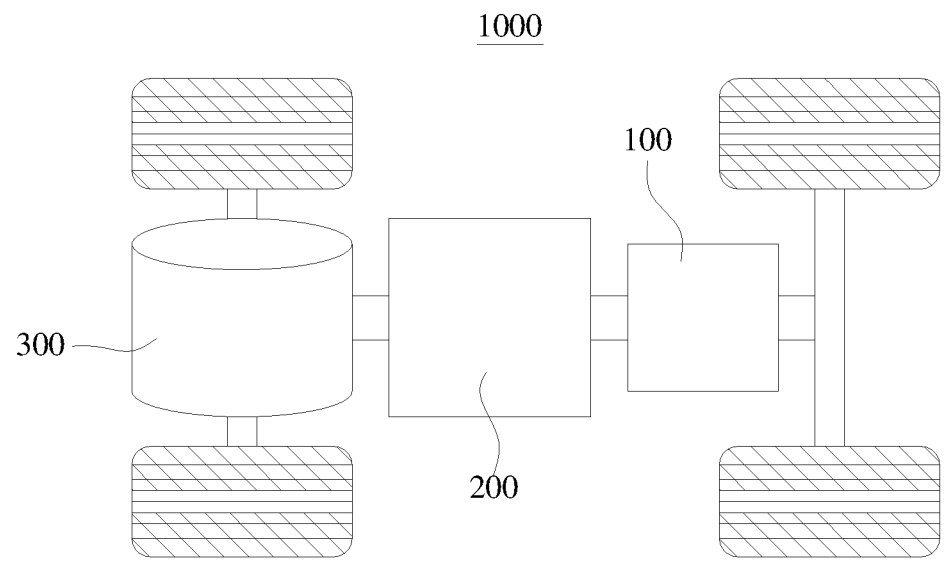
FIG. 1 is a structural diagram of a vehicle in some embodiments of the present disclosure.

Embodiments of the technical solutions of the present disclosure will be described in detail below in connection with the accompanying drawings. The following embodiments are intended only to illustrate the technical solutions of the present disclosure more clearly and are therefore only as examples and not to be used to limit the scope of protection of the present disclosure.

Unless otherwise defined, all technical and scientific terms used herein have the same meaning as commonly understood by those skilled in the art of the present disclosure; the terms used herein are for the purpose of describing specific embodiments only and are not intended to limit the present disclosure; the terms "include" and "have" and any variations thereof in the description, claims, and the brief description of drawings above of the present disclosure are intended to cover non-exclusive inclusion.

In the description of embodiments of the present disclosure, the technical terms "first", "second", etc. are used only to distinguish between different objects and are not to be construed as indicating or implying relative importance or implicitly specifying the number, particular order or priority of the indicated technical features. In the description of embodiments of the present disclosure, "plurality" means more than two, unless otherwise expressly and specifically limited.

References herein to "embodiment(s)" mean that a particular feature, structure, or characteristic described in conjunction with an embodiment may be included in at least one embodiment of the present disclosure. The occurrence of this term at various places in the description does not necessarily mean the same embodiment, nor is it a separate or alternative embodiment that is mutually exclusive with other embodiments. It is understood, both explicitly and implicitly, by those skilled in the art that the embodiment described herein may be combined with other embodiments.

In the description of embodiments of the present disclosure, the term "and/or" is simply a description of an associated relationship of associated objects, indicating that three relationships may exist, such as A and/or B, which may indicate: A alone, both A and B, and B alone. In addition, the character "/" in this document generally indicates that the associated object before and after is an "or" relationship.

In the description of embodiments of the present disclosure, the term "plurality" refers to more than two (including two), and similarly, "plurality of group" refers to more than two groups (including two groups), and "plurality of pieces" refers to more than two pieces (including two pieces).

In the description of embodiments of the present disclosure, the technical terms "center," "longitudinal," "transverse," "length", "width", "thickness", "up", "down", "front", "back", "left", "right", "vertical", "horizontal", "top", "bottom", "inside", "outside", "clockwise", "counterclockwise", "axial", "radial", "circumferential", and the like indicate orientation or positional relationships based on the orientation or positional relationships shown in the accompanying drawings, and are intended only to facilitate the description of embodiments of the present disclosure and to simplify the description, but do not indicate or imply that the devices or elements referred to must have a particular orientation, or be constructed and operate in a particular orientation, and therefore it cannot be construed as a limitation on the embodiments of the present disclosure.

In the description of embodiments of the present disclosure, unless otherwise expressly specified and limited, the technical terms "installation", "linkage", "connection", and "fixation" should be understood in a broad sense. For example, it can be a fixed connection, a detachable connection, or integrated into one piece; it can also be a mechanical connection or an electrical connection; it can be a direct connection or an indirect connection through an intermediate medium, and can be an internal connection between two components or an interaction relationship between two components. For those of ordinary skill in the art, the specific meaning of the above terms in the context of embodiments of the present disclosure can be understood based on specific circumstances.

At present, from the development of the market situation, power batteries are more and more widely used. The Power batteries are not only used in energy storage power systems such as hydraulic, thermal, wind and solar power plants, but also widely used in electric bicycles, electric motorcycles, electric cars and other electric vehicles, as well as military equipment and aerospace and many other fields. With the expansion of power battery applications, the demand for its market is also expanding.

Cooling pipelines of a cooling system of the power battery need to be connected by a connection structure, so that the cooling pipelines are in communication with each other. Before the connection structure is configured for the cooling pipelines, female and male connectors of the connection structure need to be assembled together, and need to be assembled in place before put into use. The inventors found that when assembling the male and female connectors to form the connection structure, the user usually confirms whether the male and female connectors are assembled in place by mean of observing with naked eyes or by the sound generated by collision of the male and female connectors during assembly. This judgment method has a very high error rate, resulting in frequent cases of the male and female connectors not being assembled in place. When the male and female connectors are not assembled in place, it is difficult for the user to detect, such that the connection structure that is not assembled in place is unable to function when installed in the cooling pipelines of the battery, thus affecting the service life of the battery.

Based on the above considerations, in order to solve the problem that the male and female connectors are not assembled in place frequently, and the problem that it is not easy for the user to detect when the male and female connectors are not assembled in place, the inventor, after an in-depth study, designs a connection structure including: a male connector, a female connector, a marking member, and a locking member. The female connector is provided with a through hole, and the through hole is configured for the male connector to inserted to achieve assembly with the female connector. Before the male connector is inserted into the through hole of the female connector, the marking member and the locking member are preinstalled on the female connector. Specifically, the marking member surrounds the local peripheral side of the female connector and is clamped with the female connector. The locking member and the marking member are located on the same side of the female connector, the locking member also surrounds the local peripheral side of the female connector, and the locking member passes through the marking member and is clamped with the female connector, wherein at this time, the position of the locking member is the first position. When the male connector is assembled with the female connector, that is, the male connector is inserted into the through hole of the female connector, after an insertion depth of the male connector reaches a preset value, the locking member moves from the first position in a direction close to the female connector and stops when the locking member is locked with the female connector. At this time, the locking member is in the second position, and the locking member also locks the male connector in the through hole of the female connector at the same time. When the locking member moves from the first position to the second position, the position on the locking member abutted against the marking member constantly changes, and an outer diameter of the locking member where the locking member is abutted against the locking member continuously increases, so that an outer wall of the locking member compresses an inner wall of the marking member, and applies a force in a direction away from the female connector to the inner wall of the marking member, ultimately separating the marking member from the female connector. In the technical solution of the embodiments of the present disclosure, by providing the marking member and the locking member, the locking member moves from the first position to the second position, at this time, the marking member will automatically separate from the female connector, and the locking member can no longer move relative to the female connector. By observing these two objective phenomena, the user can confirm that the male and female connectors have been assembled in place, thereby avoiding the occurrence of the male and female connectors being not assembled in place, and improving accuracy of assembly.

The connection structure 400 and battery 100 disclosed in the embodiments of the present disclosure is applicable, but are not limited to, for power consumption devices such as vehicles, ships, or aircraft. The connection structure 400, the battery 100, and so on disclosed in the present disclosure can be used to form the power consumption device of the power system. In this way, the occurrence of the male and female connectors of the connection structure 400 in the cooling system of the battery 100 not being assembled in place can be avoided, thus improving the accuracy of assembly, and ensuring the normal use of the cooling pipelines of the cooling system of the battery.

The embodiments of the present disclosure provide a power consumption device which uses a battery as a power source, wherein the power consumption device can include but is not limited to mobile phones, tablets, laptops, electric toys, electric tools, battery cars, electric cars, ships, spacecraft, and so on. Among them, the electric toys can include fixed or mobile electric toys, such as game consoles, electric car toys, electric ship toys and electric airplane toys, and the spacecraft can include planes, rockets, space shuttles and spaceships, etc.

Please refer to FIG. 1, FIG. 1 is a structural diagram of a vehicle 1000 in some embodiments of the present disclosure. The vehicle 1000 can be a fuel powered vehicle, a gas powered vehicle, or a new energy vehicle, which can be a pure electric vehicle, a hybrid electric vehicle, or an extended range vehicle, etc. The interior of the vehicle 1000 is provided with a battery 100, and the cooling pipelines of the cooling system of the battery 100 are connected through the connection structure 400 disclosed in the embodiments of the present disclosure, wherein the battery 100 can be provided at a bottom, head, or tail of the vehicle 1000. The Battery 100 can be used for the power supply of vehicle 1000, for example, the battery 100 can serve as an operating power supply of vehicle 1000. The vehicle 1000 can also include a controller 200 and a motor 300, and the controller 200 is configured for controlling the battery 100 to supply power to the motor 300, for example, for power requirements of the starting, navigation, and driving of the vehicle 1000.

Figure 2:
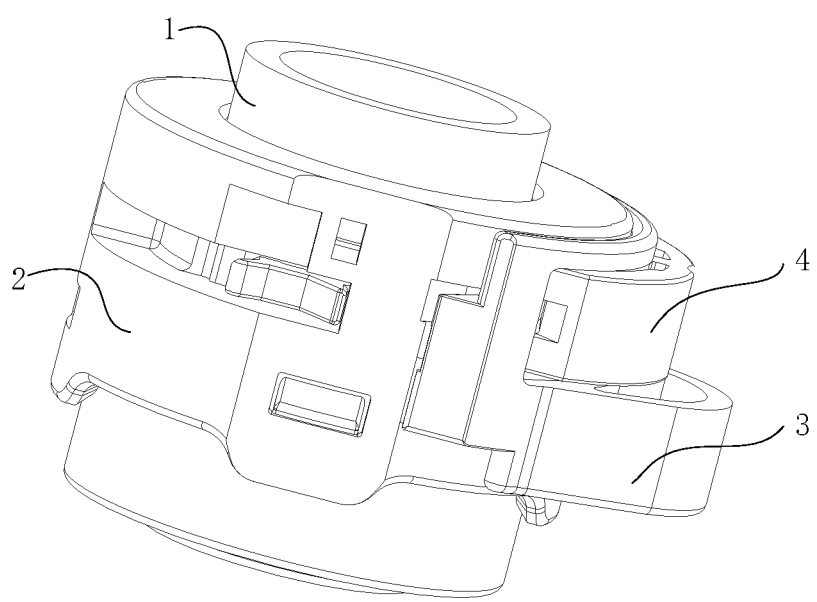
FIG. 2 is an assembled structural diagram of a connection structure in some embodiments of the present disclosure.
Figure 3:
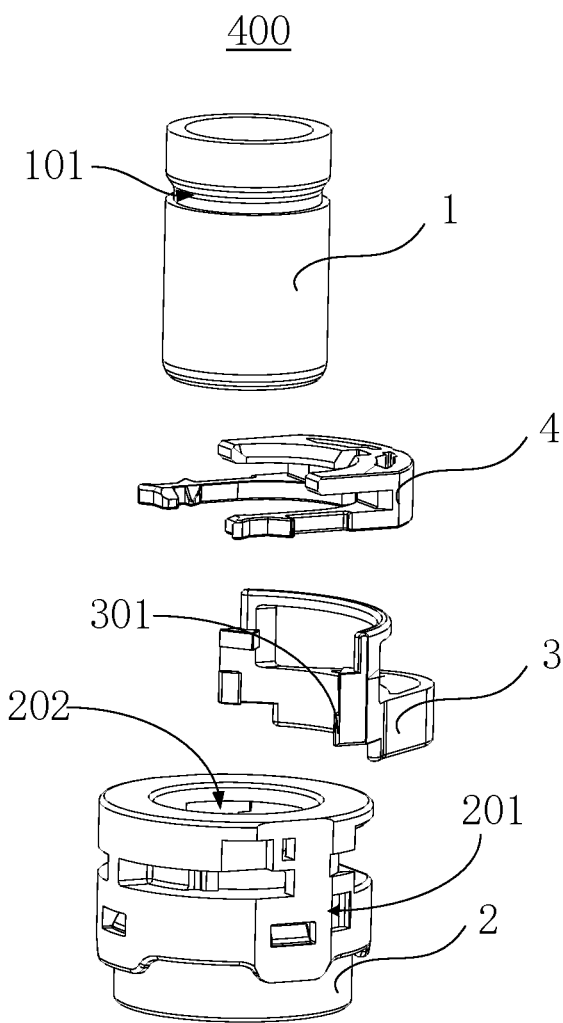
FIG. 3 is a disassembled structural diagram of the connection structure provided in an embodiment of the present disclosure.
Figure 12:
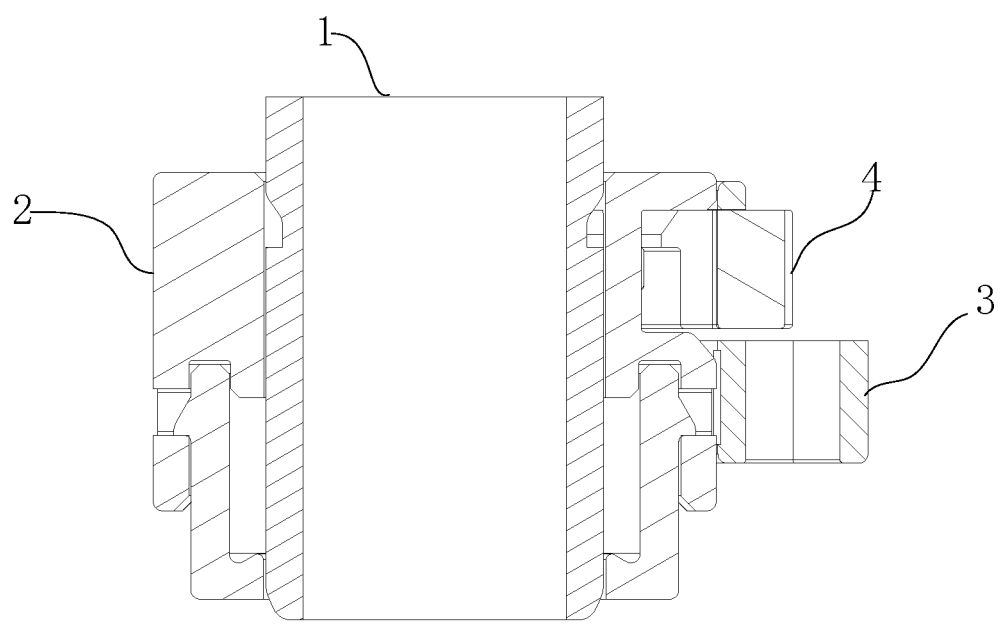
FIG. 12 is a sectional structural diagram of another perspective of the connection structure provided in an embodiment of the present disclosure.

Referring to FIGS. 2, 3, and 12, FIG. 2 is an assembled structural diagram of the connection structure 400 of some embodiments of the present disclosure, FIG. 3 is a disassembled structural diagram of the connection structure 400 provided in the embodiments of the present disclosure, and FIG. 12 is a sectional structural diagram of another perspective of the connection structure provided in the embodiments of the present disclosure. In some embodiments, the connection structure 400 includes: a male connector 1; a female connector 2, including a first clamping portion and a through hole 202 for inserting the male connector 1; a marking member 3, including a second clamping portion, which is configured to be clamped with the first clamping portion; a locking member 4, installed on the female connector 2, wherein the locking member 4 is configured to move from a first position to a second position when an insertion depth of the male connector 1 reaches a preset value, so as to lock the male connector 1, and drive the second clamping portion to separate from the first clamping portion.

The male connector 1 refers to a connecting member formed with a through-via in the middle, and the female connector 2 refers to a connecting member formed with a through hole 202 inside that is adapted to the male connector 1. The male connector 1 is embedded in the through hole 202 of the female connector 2 and is relatively fixed with the female connector 2. Specifically, the male connector 1 and the female connector 2 are cooperated with the locking member 4 through the marking member 3, so as to assemble the male connector 1 and female connector 2 in place, and then put them into the cooling pipelines of the cooling system of battery 100 to communicate the cooling pipelines; the first position refers to a position where the male connector 1 can smoothly insert into the through hole 202 of the female connector 2 when the locking member 4 is connected to the female connector, and the second position refers to a position where the male connector 1 cannot continue to move downwards along the through hole 202 of the female connector 2 when the locking member 4 is locked with the female connector 2.

Before the male connector 1 is inserted into the through hole 202 of the female connector 2, both the marking member 3 and the locking member 4 are preinstalled on the female connector 2. Specifically, the marking member 3 surrounds a local peripheral side of the female connector 2, the second clamping portion of the marking member 3 is clamped with the first clamping portion on the peripheral side of the female connector 2, the locking member 4 and the marking member 3 are located on the same side of the female connector 2, and the locking member 4 also surrounds the local peripheral side of the female connector 2. The locking member 4 passes through the marking member 3 and is movably clamped with the female connector 2, and at this time, the position of the locking member 4 is the first position. When the male connector 1 is assembled with the female connector 2, that is, the male connector 1 is inserted into the through hole 202 of the female connector 2, and after the insertion depth of the male connector 1 reaches the preset value, the locking member 4 moves from the first position in a direction close to the female connector 2. When the locking member 4 is no longer movable, it is locked with the female connector 2, and locks the male connector 1 in the through hole 202 of the female connector 2 at the same time. When the locking member 4 moves from the first position in the direction close to the female connector 2, a position on the locking member 4 abutted against the marking member 3 continuously changes, and an outer diameter of the locking member 4 at a position where the locking member 4 is abutted against the marking member 3 continues to increase, so that an outer wall of the locking member 4 compresses an inner wall of the marking member 3, and applies a force in a direction away from the female connector 2 to the inner wall of the marking member 3, ultimately separating the second clamping portion of the marking member 3 from the first clamping portion of the female connector 2. In the technical solution of the embodiments of the present disclosure, by providing the marking member 3 and the locking member 4, the marking member 3 will automatically separate from the female connector 2 when the male connector 1 and the female connector 2 are assembled in place, and the locking member 4 can no longer move relative to the female connector 2. By observing these two objective phenomena, the user can confirm that the male connector 1 and the female connector 2 have been assembled in place, thereby avoiding the occurrence of the male connector 1 and the female connector 2 being not assembled in place, and improving accuracy of assembly.

Figure 5:
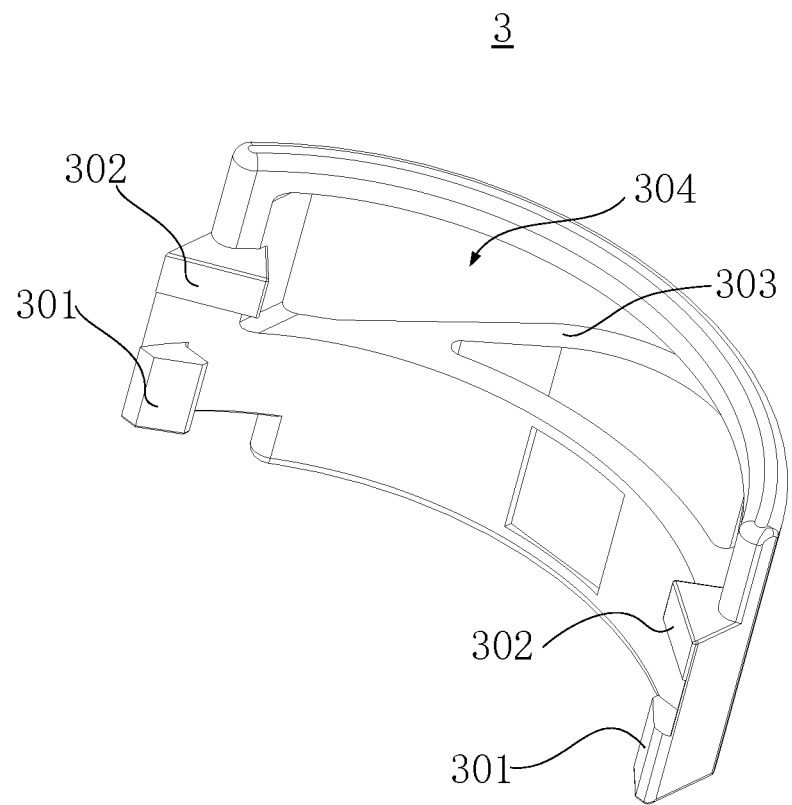
FIG. 5 is a structural diagram of a marking member provided in an embodiment of the present disclosure.
Figure 6:
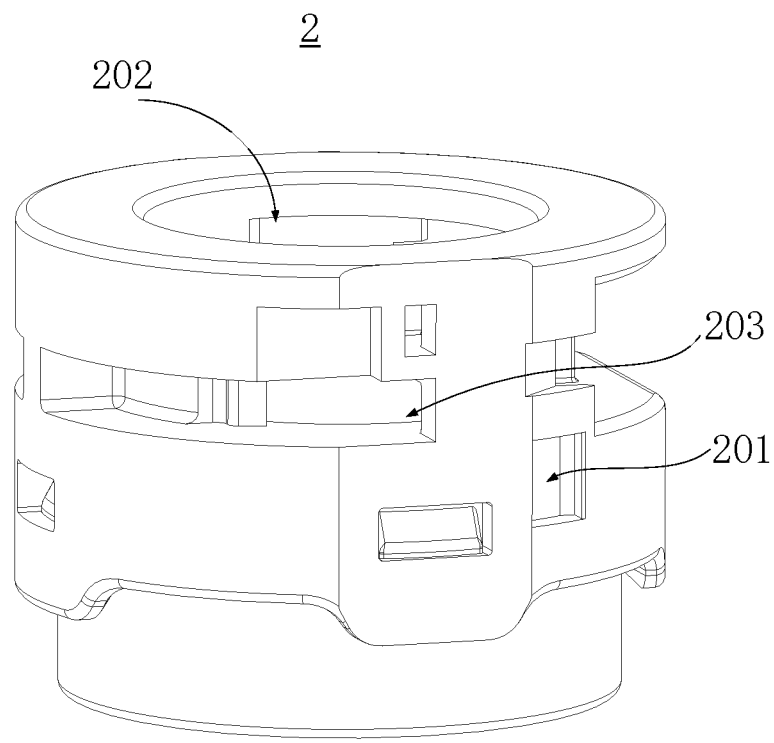
FIG. 6 is a structural diagram of the a female connector provided in an embodiment of the present disclosure.
Figure 9:
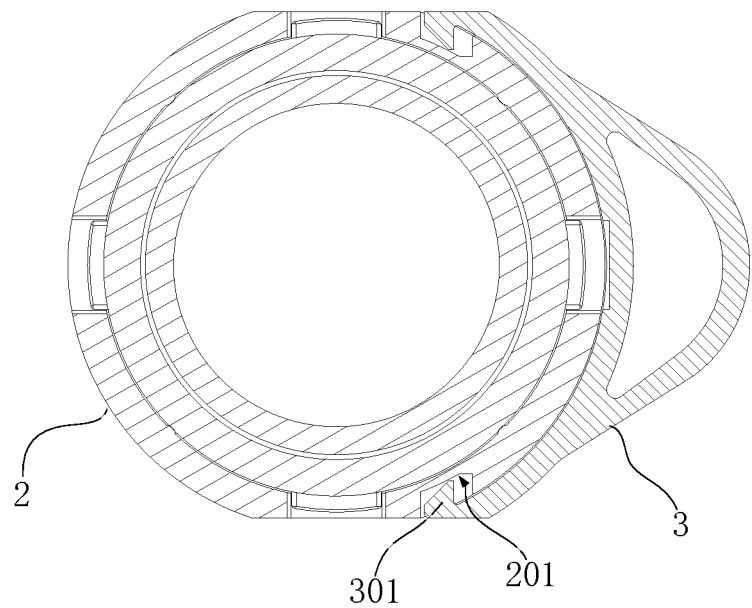
FIG. 9 is a sectional structural diagram of a connection between the marking member and the female connector provided in an embodiment of the present disclosure.

Referring to FIGS. 3, 5, 6, and 9, FIG. 5 is a structural diagram of a marking member 3 provided in the embodiments of the present disclosure, FIG. 6 is a structural diagram of the female connector 2 provided in the embodiments of the present disclosure, and FIG. 9 is a sectional structural diagram of a connection between the marking member and the female connector provided in the embodiments of the present disclosure. In some embodiments of the present disclosure, the first clamping portion is configured to be provided at the first clamping groove 201 on the outer side of the female connector 2, and the second clamping portion is configured to be provided at the first clamping hook 301 on the marking member 3.

The first clamping groove 201 refers to an inward concave groove opened on the peripheral side of the female connector 2 in a direction close to an axis of the female connector 2. The first clamping groove 201 can be of any shape such as rectangular, circular, trapezoidal, etc. Correspondingly, s first clamping hook 301 is provided on the marking member 3, and the shape of the first clamping hook 301 is matched with the inner wall surface of the first clamping groove. The first clamping hook 301 is a block-like structure that can be embedded in the first clamping groove 201, and the first clamping hook 301, when embedded into the first clamping groove 201, can only move in a radial direction parallel to the female connector 2.

The inner wall surface of the first clamping groove 201 on the peripheral side of the female connector 2 is matched with the outer wall of the first clamping hook 301 of the marking member 3. The marking member 3 and the female connector 2 are connected by means of clamping of the first clamping hook 301 in the first clamping hook 201, which is not only simple in structure, but also more convenient for the locking member 4 to compress the marking member 3 to separate the marking member 3 from the female connector 2. On the premise of ensuring that the female connector 2 and the male connector 1 are assembled in place, the assembly efficiency of the female connector 2 and male connector 1 can be improved.

Referring to FIGS. 5 and 6, in some embodiments of the present disclosure, the number of the first clamping grooves 201 is two, and the two first clamping grooves 201 are formed at intervals on the peripheral side of the female connector 2; the number of the first clamping hooks 301 is two, and the two first clamping hooks 301 are respectively configured to be clamped with the two first clamping grooves 201.

By providing two sets of first clamping grooves 201 and first clamping hooks 301 that are mutually cooperated and clamped, wherein the two sets of first clamping grooves 201 and first clamping hooks 301 are respectively located at two symmetrical ends of the peripheral side of the female connector 2, the stability of the connection between the marking member 3 and the female connector 2 is ensured.

Figure 4:
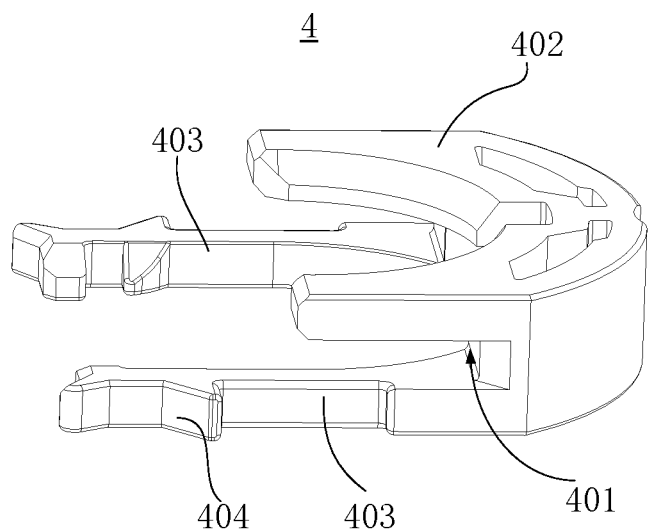
FIG. 4 is a structural diagram of a locking member provided in an embodiment of the present disclosure.

Referring to FIG. 4, FIG. 4 is a structural diagram of the locking member 4 provided in the embodiments of the present disclosure. In some embodiments of the present disclosure, the locking member 4 is formed with a second clamping groove 401, the marking member 3 is provided with a second clamping hook 302, and the second clamping hook 302 is configured to be clamped with the second clamping groove 401, wherein when the locking member 4 is moved from the first position to the second position, the locking member 4 is configured to drive the second clamping hook 302 to separate from the second clamping groove 401.

The second clamping groove 401 refers to a structure formed by a connection of a clamping platform 402 of the locking member 4 and a connecting arm 403. The second clamping hook 302 is a convex block, and the periphery of the second clamping hook 302 is matched with the inner wall of the second clamping groove 401, and can be inserted into the second clamping groove 401.

Since the marking member 3 itself is clamped in the first clamping hook 201 of the female connector 2 through the first clamping hook 301, the position of the marking member 3 relative to the female connector 2 is fixed. After the second clamping hook 302 is provided on the marking member 3 and the second clamping groove 401 is provided on the locking member 4, when the locking member 4 is in the first position, the second clamping hook 302 is exactly clamped in the second clamping groove 401 of the locking member 4, so that the locking member 4 is connected to the marking member 3. On the one hand, positioning of the locking member 4 is achieved, that is, when the second clamping hook 302 of the marking member 3 is exactly clamped in the second clamping groove 401 of the locking member 4, the locking member 4 is exactly in the first position, and in this way, it can be ensured that the male connector 1 can be smoothly inserted into the through hole 202 of the female connector 2; on the other hand, when the locking member 4 moves from the first position to the second position, the locking member 4 compresses the locking member 3, so that the marking member 3 is separated from the locking member 4 while is also separated from the female connector 2, providing an objective reference condition for the user to confirm whether the female connector 2 and male connector 1 are assembled in place.

Referring to FIG. 4, in some embodiments of the present disclosure, the number of the second clamping grooves 401 is two, and the two second clamping grooves 401 are correspondingly arranged on two sides of the locking member 4; the number of the second clamping hooks 302 is two, and the two second clamping hooks 302 are respectively configured to be clamped with the two second clamping grooves 401.

By providing two sets of second clamping grooves 401 and second clamping hooks 302 that are mutually cooperated and clamped, wherein the two sets of second clamping grooves 401 and second clamping hooks 302 are respectively located at two symmetrical ends of the marking member 3 or the locking member 4, the stability of the connection between the marking member 3 and the locking member 4 is ensured.

Referring to FIGS. 3 and 4, in some embodiments of the present disclosure, the peripheral surface of the male connector 1 is formed with an annular groove 101, and the locking member 4 includes a clamping platform 402 and two connecting arms 403 located below the clamping platform 402. The two connecting arms 403 are provided at intervals below the clamping platform 402, and two second clamping grooves 401 are formed between the two connecting arms 403 and the platform 402. The clamping platform 402 is configured to be inserted into the annular groove 101 when the locking member 4 is in the second position.

The clamping platform 402 refers to a U-shaped structure, which includes an arc-shaped portion and an extension portion connected at two ends of the arc-shaped portion. The annular groove 101 refers to a structure formed by a circumference of the outer wall surface of the male connector 1 being concave in a direction close to the axis of the male connector 1 within a certain height range. When the clamping platform 402 is inserted into the annular groove 101, the inner wall surface of the clamping platform 402 is abutted against the outer wall surface of the annular groove 101.

When the male connector 1 is inserted into the through hole 202 of the female connector 2, and when the annular groove 101 and the clamping platform 402 of the locking member 4 are in the same plane, the insertion depth of the male connector 1 reaches the preset value, so that the locking member 4 can move from the first position to the second position to make the inner diameter of the clamping platform 402 of the locking member 4 abut against the outer diameter of the annular groove 101 of the male connector. As the inner diameter of the clamping platform 402 is not greater than the outer diameter of the annular groove 101 of the male connector 1, when the clamping platform 402 is inserted into the annular groove 101, the male connector 1 will not continue to move downwards along the through hole 202 of the female connector 2. At this time, the locking member 4 is locked with the male connector 1, while the locking member 4 has also been locked with the female connector 2, so that the male connector 1 is locked with the female connector 2, thus completing the assembly of the male connector 1 and the female connector 2.

Figure 10:
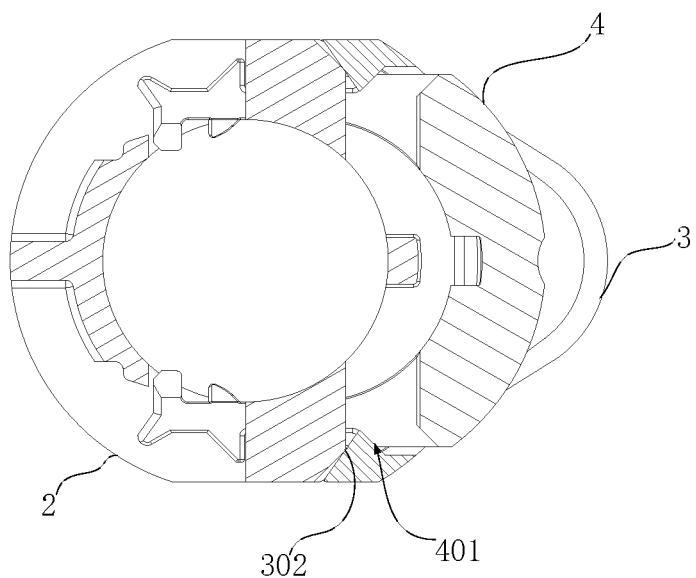
FIG. 10 is a sectional structural diagram of a connection between the locking member and the marking member provided in an embodiment of the present disclosure.
Figure 11:
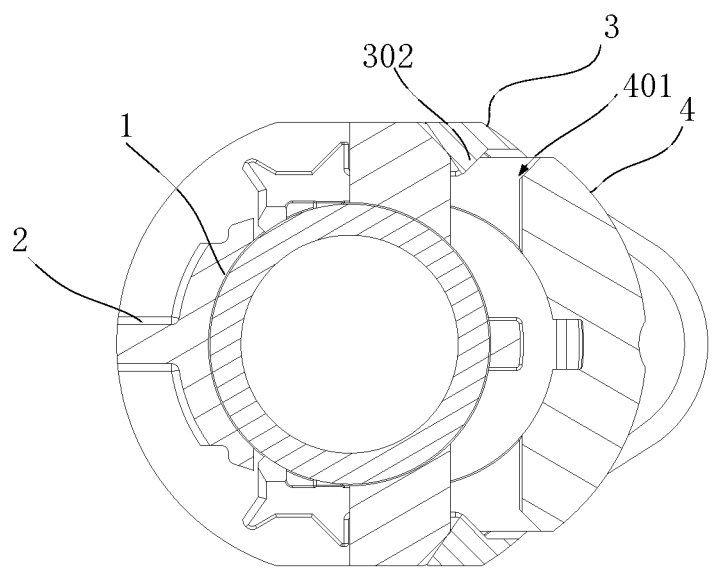
FIG. 11 is a sectional structural diagram of one perspective of a connection structure provided in an embodiment of the present disclosure.

Referring to FIGS. 4, 6, 8, 10, and 11, FIG. 8 is a sectional structural diagram of a connection between the locking member 4 and the female connector 2 provided in the embodiments of the present disclosure, FIG. 10 is a sectional structural diagram of a connection between the locking member 4 and the marking member 3 provided in the embodiments of the present disclosure, and FIG. 11 is a sectional structural diagram of one perspective of the connection structure provided in the embodiments of the present disclosure. In some embodiments of the present disclosure, the peripheral side of the female connector 2 is formed with a third clamping groove 203, and the locking member 4 is also provided with a third clamping hook 404, wherein the third clamping hook 404 is configured to be inserted into the third clamping groove 203 when the locking member 4 is in the first position.

By providing a third clamping groove 203 on the peripheral side of the female connector 2, and correspondingly providing a third clamping hook 404 on the locking member 4, when the third clamping hook 404 of the locking member 4 is clamped with the third clamping groove 203 of the female connector 2, the locking member 4 is exactly in the first position, so that positioning of the locking member 4 is achieved, enabling the locking member 4 to quickly be in the first position during installation. In addition, this can also prevent the locking member 4 from accidentally falling off the female connector 2. Meanwhile, when the locking member 4 is in the first position, as the clamping platform 402 of the locking member 4 is located between the inner diameter and the outer diameter of the through hole 202 of the female connector 2, it can be ensured that the male connector 1 can be smoothly inserted into the through hole 202 of the female connector 2.

In some embodiments of the present disclosure, the number of the third clamping grooves 203 is two, and the two third clamping grooves 203 are provided at intervals on the peripheral side of the female connector 2; the number of the third clamping hooks 404 is two, and the two third clamping hooks 404 are provided at respective ends of the two connecting arms 403 away from the clamping platform 402.

By providing two sets of third clamping grooves 203 and third clamping hooks 404 that are mutually cooperated and clamped, wherein the two sets of third clamping grooves 203 and third clamping hooks 404 are respectively located at two symmetrical ends of the female connector 2 or the locking member 4, the stability of the connection between the female connector 2 and the locking member 4 is ensured.

Figure 8:
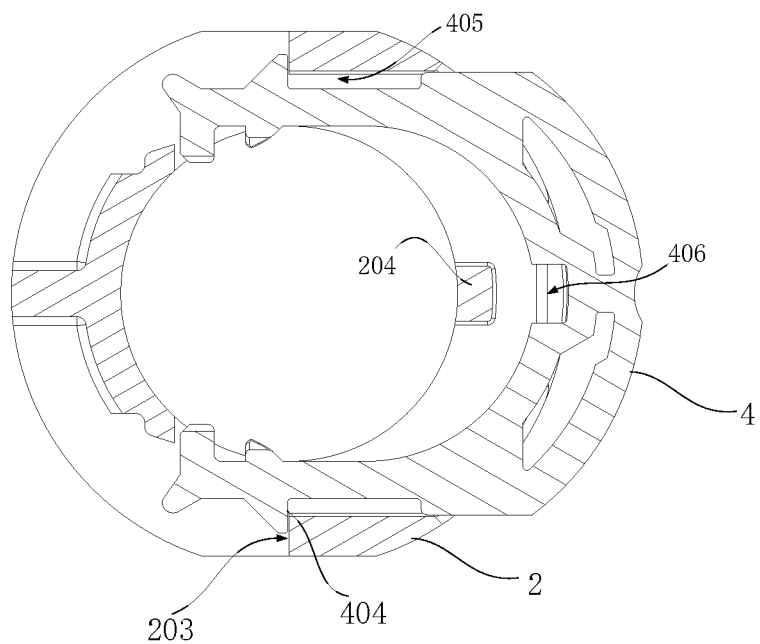
FIG. 8 is a sectional structural diagram of a connection between the locking member and the female connector provided in an embodiment of the present disclosure.

Referring to FIG. 8, in some embodiments of the present disclosure, a groove 405 is provided on a side of the connecting arm 403 away from the through hole 202, and the groove 405 is configured to be abutted against the female connector 2 when the male connector 1 is inserted into the through hole 202.

By providing the groove 405, during the assembly of the male connector 1 and the female connector 2, the groove 405 is abutted against the local peripheral side of female connector 2, thereby increasing the contact area between the locking member 4 and the female connector 2, and ensuring the stability of the connection between the locking member 4 and the female connector 2.

Referring to FIG. 8, in some embodiments of the present disclosure, a side of the locking member 4 facing the through hole 202 is formed with a limit groove 406, and an edge of the through hole 202 is provided with a limit block 204 arranged corresponding to the limit groove 406. The limit block 204 is configured to be inserted into the limit groove 406 when the locking member 4 is in the second position.

By providing a limit block 204 outside the edge of the through hole 202 of the female connector 2, and providing a limit groove 406 correspondingly on the locking member 4, when the locking member 4 moves to the second position, that is, when the female connector 2 and the male connector 1 are assembled in place, the limit block 204 is exactly inserted into the limit groove 406, thereby preventing the locking member 4 from moving, so that the structure is simple and the operation is convenient.

Referring to FIG. 5, in some embodiments of the present disclosure, the marking member 3 is provided with a pulling portion 303, which is configured for the user to remove the marking member 303 from the locking member 4.

By providing the pulling portion 303, when the assembly of the male connector 1 and the female connector 2 is completed, it is convenient for the user to remove the marking member 3 from the locking member 4 through the pulling portion 303, so as to provide a force application point for the user to remove the marking member 3, facilitating the user operation.

Referring to FIG. 5, in some embodiments of the present disclosure, the marking member 3 is formed with an installation gap 304, which is configured to accommodate a part of the locking member 4.

By providing the installation gap 304, the locking member 4 can pass through the marking member 3 from the installation gap 304, and then surround the local peripheral side of the female connector 2 and is connected to the female connector 2.

Figure 7:
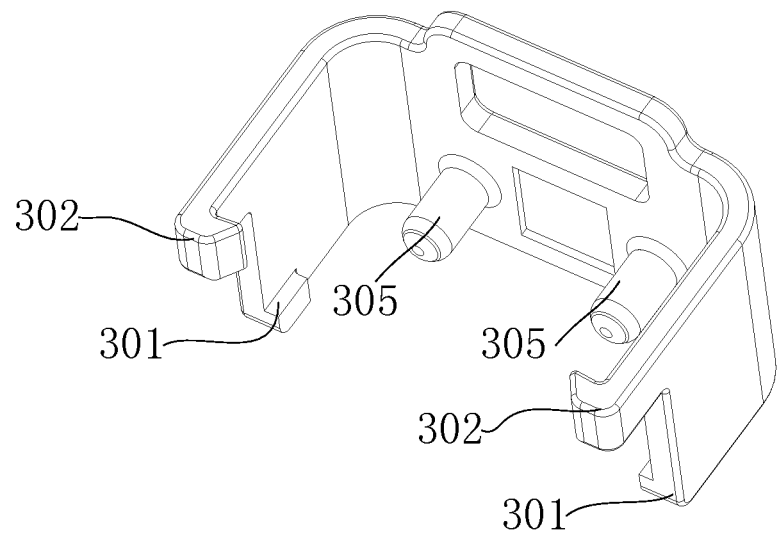
FIG. 7 is a structural diagram of another marking member provided in an embodiment of the present disclosure.

Referring to FIG. 7, in some embodiments of the present disclosure, a positioning column 305 is provided on a side of the marking member 3 facing the locking member 4, and a positioning hole (not shown in the figure) is formed on a side of the locking member 4 facing the marking member 3. The positioning column 305 is inserted into the positioning hole to connect the locking member 4 and the marking member 3.

Finally, it should be noted that the above embodiments are only used to illustrate the technical solutions of the present disclosure and not to limit it; although the present disclosure has been described in detail with reference to the aforementioned embodiments, ordinary technical personnel in the art should understand that they can still modify the technical solutions recorded in the aforementioned embodiments, or equivalently replace some or all of the technical features therein; these modifications or substitutions do not separate the essence of the corresponding technical solutions from the scope of the technical solutions of the various embodiments of the present disclosure, and they should all be covered within the scope of the claims and the description of the present disclosure. Especially, as long as there is no structural conflict, the various technical features mentioned in respective embodiments can be combined in any way. the present disclosure is not limited to the specific embodiments disclosed in the text, but includes all the technical solutions falling within the scope of the claims.

What is claimed is:

1. A connection structure, comprising:
   a male connector;
   a female connector, comprising a first clamping portion and a through hole for inserting the male connector;
   a marking member, comprising a second clamping portion, wherein the second clamping portion is configured to be clamped with the first clamping portion; and
   a locking member, installed on the female connector, wherein the locking member is configured to move from a first position to a second position when the male connector is inserted into the through hole of the female connector, so as to lock the male connector and drive the second clamping portion to separate from the first clamping portion;
   wherein a peripheral surface of the male connector is provided with an annular groove, the locking member comprises a clamping platform and two connecting arms arranged below the clamping platform, the two connecting arms are provided at intervals below the clamping platform, and the clamping platform is configured to be inserted into the annular groove when the locking member is in the second position.

2. The connection structure according to claim 1, wherein the first clamping portion is configured as a clamping groove provided on a peripheral side of the female connector, and the second clamping portion is configured as a clamping hook provided on the marking member.

3. The connection structure according to claim 2, wherein:
   the clamping groove is one of two clamping grooves arranged at intervals on the peripheral side of the female connector; and
   the clamping hook is one of two clamping hooks configured to be clamped with the two clamping grooves, respectively.

4. The connection structure according to claim 1, wherein the locking member is provided with a clamping groove, the marking member is provided with a clamping hook, and the clamping hook is configured to be clamped with the clamping groove, wherein the locking member is configured to, when the locking member moves from the first position to the second position, drive the clamping hook to separate from the clamping groove.

5. The connection structure according to claim 4, wherein:
the clamping groove is one of two clamping grooves correspondingly provided on two sides of the locking member; and
the clamping hook is one of two clamping hooks configured to be clamped with the two clamping grooves, respectively.

6. The connection structure according to claim 5, wherein the two clamping grooves are formed between the two connecting arms and the clamping platform.

7. The connection structure according to claim 1, wherein one side of each of the two connecting arms away from the through hole is provided with a groove, which is configured to be abutted against the female connector when the male connector is inserted into the through hole.

8. The connection structure according to claim 1, wherein a peripheral side of the female connector is provided with a clamping groove, the locking member is further provided with a clamping hook, and the clamping hook is configured to be inserted into the clamping groove when the locking member is in the first position.

9. The connection structure according to claim 8, wherein:
the clamping groove is one of two clamping grooves provided at intervals on the peripheral side of the female connector; and
the clamping hook is one of two clamping hooks provided at respective ends of the two connecting arms away from the clamping platform.

10. The connection structure according to claim 1, wherein one side of the locking member facing the through hole is provided with a limit groove, and an edge of the through hole is provided with a limit block corresponding to the limit groove, wherein the limit block is configured to be inserted into the limit groove when the locking member is in the second position.

11. The connection structure according to claim 1, wherein the marking member is provided with a pulling portion, which is configured for a user to remove the marking member from the locking member.

12. The connection structure according to claim 1, wherein the marking member is provided with an installation gap, which is configured to accommodate a part of the locking member.

13. The connection structure according to claim 1, wherein one side of the marking member facing the locking member is provided with a positioning column, and one side of the locking member facing the marking member is provided with a positioning hole, wherein the positioning column is configured to be inserted into the positioning hole to connect the locking member and the marking member.

14. A battery, comprising the connection structure according to claim 1, wherein the connection structure is configured to connect cooling pipelines of a cooling system of the battery.

15. A power consumption device, comprising the battery according to claim 14, wherein the battery is configured to provide electrical energy.

16. A connection structure, comprising:
a male connector;
a female connector, comprising a first clamping portion and a through hole for inserting the male connector;
a marking member, comprising a second clamping portion, wherein the second clamping portion is configured to be clamped with the first clamping portion; and
a locking member, installed on the female connector, wherein the locking member is configured to move from a first position to a second position when the male connector is inserted into the through hole of the female connector, so as to lock the male connector and drive the second clamping portion to separate from the first clamping portion;
wherein the locking member is provided with a clamping groove, the marking member is provided with a clamping hook, the clamping hook is configured to be clamped with the clamping groove, and the locking member is configured to, when the locking member moves from the first position to the second position, drive the clamping hook to separate from the clamping groove.

17. A connection structure, comprising:
a male connector;
a female connector, comprising a first clamping portion and a through hole for inserting the male connector;
a marking member, comprising a second clamping portion, wherein the second clamping portion is configured to be clamped with the first clamping portion; and
a locking member, installed on the female connector, wherein the locking member is configured to move from a first position to a second position when the male connector is inserted into the through hole of the female connector, so as to lock the male connector and drive the second clamping portion to separate from the first clamping portion;
wherein one side of the marking member facing the locking member is provided with a positioning column, one side of the locking member facing the marking member is provided with a positioning hole, and the positioning column is configured to be inserted into the positioning hole to connect the locking member and the marking member.

* * * * *